US009243715B2

(12) United States Patent
Slack et al.

(10) Patent No.: US 9,243,715 B2
(45) Date of Patent: Jan. 26, 2016

(54) SEAL ASSEMBLY

(75) Inventors: Maurice William Slack, Edmonton (CA); Matthew Hollis Allen, Edmonton (CA)

(73) Assignee: NOETIC TECHNOLOGIES INC., Edmonton (CA)

( * ) Notice: Subject to any disclaimer, the term of this patent is extended or adjusted under 35 U.S.C. 154(b) by 945 days.

(21) Appl. No.: 13/376,367

(22) PCT Filed: Jun. 8, 2010

(86) PCT No.: PCT/CA2010/000857
§ 371 (c)(1),
(2), (4) Date: Dec. 5, 2011

(87) PCT Pub. No.: WO2010/142022
PCT Pub. Date: Dec. 16, 2010

(65) Prior Publication Data
US 2012/0080854 A1    Apr. 5, 2012

(30) Foreign Application Priority Data
Jun. 8, 2009   (CA) ...................................... 2667320

(51) Int. Cl.
*F16J 15/56*   (2006.01)
*F16J 15/48*   (2006.01)
*F15B 15/14*   (2006.01)

(52) U.S. Cl.
CPC  *F16J 15/56* (2013.01); *F16J 15/48* (2013.01); *F15B 15/1452* (2013.01)

(58) Field of Classification Search
USPC ......... 277/435, 437, 449, 452, 453, 511, 520, 277/578, 579, 580, 581, 504
See application file for complete search history.

(56) References Cited

U.S. PATENT DOCUMENTS

| 2,420,104 A | * | 5/1947 | Smith | 277/453 |
| 2,732,268 A | * | 1/1956 | Duval | 277/515 |
| 2,739,855 A | * | 3/1956 | Bruning | 277/584 |
| 3,614,114 A | * | 10/1971 | Traub | 277/589 |
| 3,936,081 A | | 2/1976 | Blumenkranz | |

(Continued)

FOREIGN PATENT DOCUMENTS

| CN | 2861553 | 1/2007 |
| CN | 101042194 A | 9/2007 |

(Continued)

OTHER PUBLICATIONS

Supplementary Partial EP Search Report—EP 10785620.5 [Jul. 28, 2014].

*Primary Examiner* — Vishal Patel
*Assistant Examiner* — L. Susmitha Koneru
(74) *Attorney, Agent, or Firm* — Donald V. Tomkins

(57) ABSTRACT

A fluid seal assembly consists of a seal element of compliant material that is retainingly carried by a seal carrier. The seal carrier includes one or more elements of relatively rigid material defining a sealing face with a seal-receiving groove interrupting the sealing face. The seal-receiving groove has groove-defining walls each of which has a proximal end at the sealing face and a distal end. The groove-defining walls serve as seal contact surfaces. The seal contact surfaces are configured such that the seal-receiving groove narrows toward its distal end. The seal-receiving groove has a depth and a breadth suitable for accepting the seal element, with the seal element projecting past the sealing face when compressed to be in contact with the seal contact surfaces.

19 Claims, 13 Drawing Sheets

(56) References Cited

U.S. PATENT DOCUMENTS

| | | | |
|---|---|---|---|
| 4,052,112 A | 10/1977 | Faber | |
| 4,143,586 A | 3/1979 | Zitting | |
| 4,256,314 A * | 3/1981 | Berglund et al. | 277/587 |
| 4,270,440 A * | 6/1981 | Lewis, II | 92/87 |
| 4,326,724 A | 4/1982 | Gernandt | |
| 4,629,200 A * | 12/1986 | Ruddy | 277/463 |
| 4,795,173 A | 1/1989 | Osborne | |
| 4,993,720 A * | 2/1991 | Ciotola | 277/641 |
| 5,632,494 A | 5/1997 | Oka | |
| 5,660,396 A * | 8/1997 | Schouten | 277/500 |
| 6,070,881 A | 6/2000 | Longree | |
| 6,502,826 B1 * | 1/2003 | Schroeder et al. | 277/468 |
| 7,191,875 B2 * | 3/2007 | Kurimoto et al. | 188/72.4 |
| 7,516,963 B2 | 4/2009 | Meller | |
| 7,866,669 B2 | 1/2011 | Kobayashi et al. | |
| 7,896,354 B2 | 3/2011 | Muramatsu | |
| 8,267,062 B2 * | 9/2012 | Chipperfield | 123/193.6 |
| 8,826,988 B2 * | 9/2014 | Gray et al. | 166/341 |
| 2003/0019637 A1 * | 1/2003 | Slack et al. | 166/380 |

FOREIGN PATENT DOCUMENTS

| | | |
|---|---|---|
| DE | 19514918 A1 | 10/1996 |
| JP | 5280647 | 10/1993 |
| JP | 10281295 | 10/1998 |
| JP | 10281295 A | 10/1998 |
| WO | 2010/048202 A2 | 4/2010 |

* cited by examiner

SEAL ASSEMBLY

FIELD OF THE INVENTION

This invention relates in general to seal assemblies, and in particular to seal assemblies for sealing tools or other devices against surfaces with large tolerances and with surface finishes typical of as-rolled steel.

BACKGROUND OF THE INVENTION

An established method of configuring elastomeric seals, typical of O-ring type seals, to seal the gap between assembled first and second close-fitting solid components, separated by an extrusion gap, is to provide a resilient, compliant, and substantially incompressible seal element (mechanical properties characteristic of elastomers) in a generally rectangular seal groove of a controlled depth (defining the groove bottom surface) and width (defining the groove sidewall surfaces) placed in the first component, referred to herein as the seal carrier, adjacent to a seal surface provided in the second component, referred to herein as the workpiece. The unconstrained seal element depth is selected to exceed the sum of the groove depth and gap between the seal carrier and the seal surface of the workpiece, so that interference is created between the seal element and the groove bottom and workpiece seal surfaces of the assembled components. This interference tends to deform the compliant elastomer by compression in a direction normal to the seal surface and, due to its substantially incompressible bulk properties, elongation in the transverse direction. To accommodate the elongation, the seal groove width typically slightly exceeds the seal element's deformed width to volumetrically accommodate this deformation. This is typically desirable to promote pressure activation and avoid pressure entrapment in the cavities between the sidewall and the seal element.

Configured thus, the seal element is forced into contact with the workpiece surface and the groove bottom where, as is known in the art, the initiation of the seal function is dependent on arranging the design parameters of geometry, surface roughness, elastomer compliance, and amount of interference to ensure that the initial contact stress distribution is sufficient to result in conforming contact both between the seal element and the workpiece surface and between the seal element and the seal groove bottom. However, the effectiveness of this type of seal in some applications is limited, especially where surface roughness of the workpiece is high and cannot be readily controlled, and where the extrusion gap tolerances are loose. In such applications, it can be difficult or impossible to arrange the available design parameters to provide the amount of interference required to achieve a reliable seal, within the allowable deformation limits of the available elastomeric materials with respect to material properties, and within seal load constraints.

Also, the established method of installing an elastomeric seal is to stretch the seal element over the seal carrier into the fixed-geometry groove. This method of installation becomes increasingly difficult as the seal element thickness become large relative to the seal length.

The present invention addresses the foregoing problems.

BRIEF SUMMARY OF THE INVENTION

In broad terms, the present invention provides a fluid seal assembly comprising a seal carrier made of relatively rigid material and defining a sealing face, with the sealing face being interrupted by a seal-receiving groove, for receiving a resilient seal element.

The seal-receiving groove has groove-defining walls, each having a proximal end at the sealing face and a distal end (i.e., away from the sealing face). The groove-defining walls serve as seal contact surfaces. The groove-defining walls converge so as to narrow the seal-receiving groove toward its distal end. The seal-receiving groove has a depth and a breadth suitable for accepting the seal element such that the seal element projects beyond the sealing face when it is brought into contact with the seal contact surfaces.

The above-described fluid seal assembly provides an alternative to prior art seal assemblies. It will be understood that having the seal element wedged into a converging seal-receiving groove facilitates provision of an effective seal through an increased range of sealing gaps. When not confined by contact with a workpiece, the seal element tends to move outwardly from the seal carrier to a neutral position (i.e., with no external force or pressure urging the seal element into the seal groove). This simplifies the replacement of worn seals.

Although beneficial results may be obtained through the use of the fluid seal assembly as described above, in some configurations the seal element may tend to fall out of the seal carrier when it is not confined by contact with a workpiece and has moved to a neutral position. In such applications, it is preferred that the seal-receiving groove be narrowed at the sealing face by providing seal retention means associated with the proximal end of the seal-receiving groove. In preferred embodiments, the seal retention means is provided by configuring a proximal portion of at least one of the groove-defining walls to form an inwardly-projecting seal retention face at the proximal end of at least one of the seal contact surfaces ("inwardly-projecting" meaning, in this context, that the seal retention face is canted toward the opposing groove-defining wall). It will be understood that the seal retainer means may be provided in forms other than retention faces as described above.

To ensure that the seal element is supported by the converging walls of the seal-receiving groove only, it is preferred that the maximum depth to which the seal element can extend into and contact the seal-receiving groove is less than the total depth of the seal-receiving groove, so as to define a clearance interval of the seal-receiving groove walls distal of the region of contact with the seal element. The space between the clearance intervals of the opposing groove walls define the bottom of the groove, and together with the seal, enclose an inner pressure chamber distal to both seal contact intervals.

To promote pressure activation and prevent pressure entrapment, it is desirable to provide means to allow fluid pressure from the high-pressure side of the seal to communicate with the inner pressure chamber, i.e., bypass the seal contact region of the seal-receiving groove side wall positioned on the intended high-pressure side of the seal-receiving groove. Examples of possible means for providing such fluid communication with the inner pressure chamber include: providing a port extended from the sealing face through the seal carrier to the inner pressure chamber; notches provided across the contact interval of the seal-receiving groove wall on the high-pressure side; and similar notches provided in the seal face across the portion of its surface mating with the contact interval of the seal-receiving groove wall on the high-pressure side. Fluid can thus flow from the high-pressure side of the sealing face to communicate with the inner pressure chamber to pressurize the seal under the action of increased differential pressure, and to correlatively depressurize this region when differential pressure is decreased; thus, respectively, providing pressure activation and avoiding pressure entrapment.

In axi-symmetric applications, as the cross-sectional area (or chord size or thickness) of a seal element is increased, it becomes more difficult to remove the seal element from the seal carrier by stretching, particularly where the thickness-to-diameter ratio is relatively large. In such cases, it is preferred that the seal carrier be formed with first and second components, with each seal carrier component comprising one of the groove-defining walls. This makes it possible to separate the first and second seal carrier components to facilitate removal of the seal element in cases where the thickness of the seal element makes removal by stretching difficult.

As is known in the art, a seal element that is perfectly circular in cross-section can tend to roll under certain conditions of relative sliding between the workpiece and the seal carrier. An example of this tendency to roll is manifest in the well-known torsional failure mode of axi-symmetric O-ring seals deployed to seal the annulus between a piston sliding in a bore. The toroidal shape of these seals does not resist rotation about the toroidal axis, therefore allowing segments of the seal element to roll about the toroidal axis and accumulate twist that can lead to premature failure. In applications where there is concern about the seal element rolling, it is preferred that the seal cross-section be modified to resist rolling. Although the modified seal element can remain generally circular in cross-section, it is then preferred for the seal element to be provided with portions that are substantially flat in cross-section and that generally correspond to and mate with the seal contact surfaces of the seal-receiving groove. The engagement under pressure of the flat portions of the seal element with the flat seal contact surfaces will reduce rolling. However, resistance to rolling is more preferably achieved by providing the seal with a more non-circular cross-section so that its characteristic depth is greater than its width; i.e., elongate in the direction normal to the workpiece surface.

BRIEF DESCRIPTION OF THE DRAWINGS

Embodiments of the invention will now be described with reference to the accompanying Figures, in which numerical references denote like parts, and in which.

DETAILED DESCRIPTION OF PREFERRED EMBODIMENTS

General Principles

Figure 1:
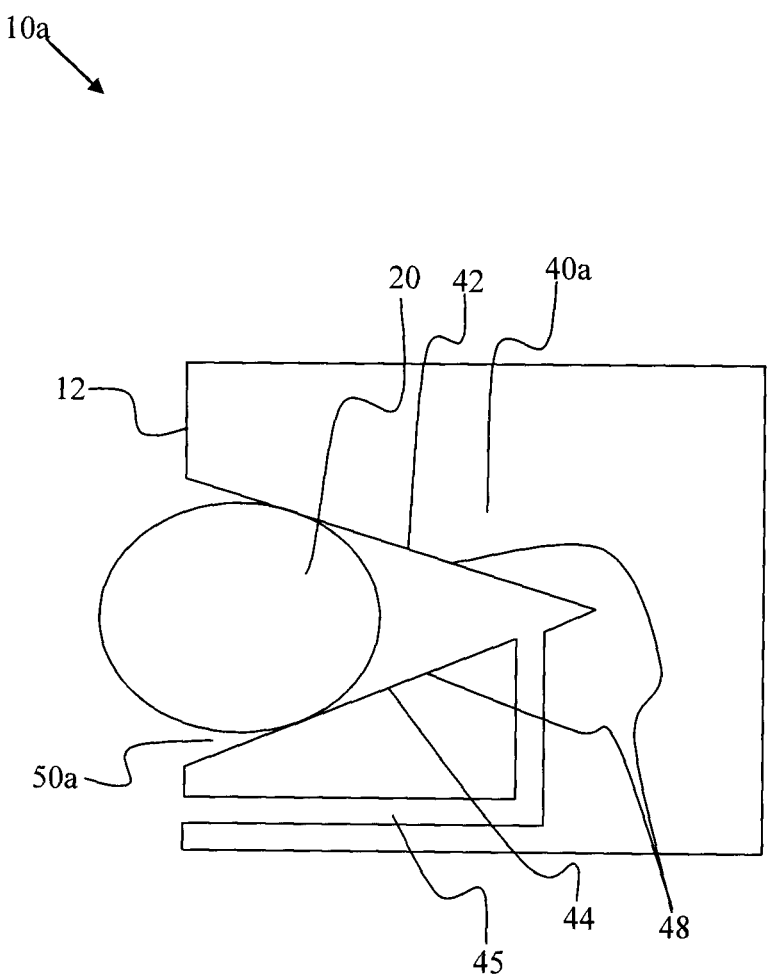
FIG. 1 is a schematic cross-section through a seal assembly in accordance with a first embodiment of the present invention, with a V-shaped seal-receiving groove.

With reference to FIGS. 1 through 6, the general principles of the seal assembly of the present invention will now be described. FIG. 1 is a schematic cross-section through a seal assembly 10a in accordance with one embodiment of the invention, shown in isolation from a workpiece. Seal assembly 10a comprises a seal carrier 40a and a resilient seal element 20. Seal carrier 40a has a proximal face 12 and defines a generally V-shaped seal-receiving groove (or simply "seal groove") 50a, for receiving seal element 20. Seal groove 50a intercepts proximal face 12 and, in the embodiment of FIG. 1, reduces in width as it penetrates into seal carrier 40a. Seal groove 50a is defined by contact faces 42 and 44, which are extended to form a pair of clearance faces 48. These clearance faces or intervals at the distal ends of the seal-receiving groove walls extend distally of the region of contact with the seal element supporting the seal element. The clearance faces are shown herein as being contiguous with the V-shaped contact faces 42 and 44, but may be variously configured in alternative embodiments. The length and angles of contact faces 42 and 44 of clearance faces 48 are selected in conjunction with the size and shape of seal element 20 to allow for inward displacement of seal element 20 into seal groove 50a, and also to allow seal element 20 to return to a neutral position when unloaded.

As shown by way of example in FIG. 1, seal carrier 40a optionally incorporates a high-pressure fluid port 45 extending between proximal face 12 of seal carrier 40a and a selected location on a selected clearance face, such that the distal (i.e., inner) region of seal groove 50a is in fluid communication with a source of higher pressure. The purpose and function of high-pressure fluid port 45 will be described in greater detail later in this specification.

Depending on the configuration of seal groove 50a, the seal groove geometry of seal assembly 10a may allow seal element 20 to come out of seal groove 50a completely when unloaded, and in such cases some means for retention may be required. Seal retention can be effected by hoop stress in seal element 20 in cases where the seal carrier and workpiece are generally axi-symmetric in shape. However, it may be desirable to have additional or alternative seal retention means, examples of which are illustrated in FIGS. 2 through 6.

Figure 2:
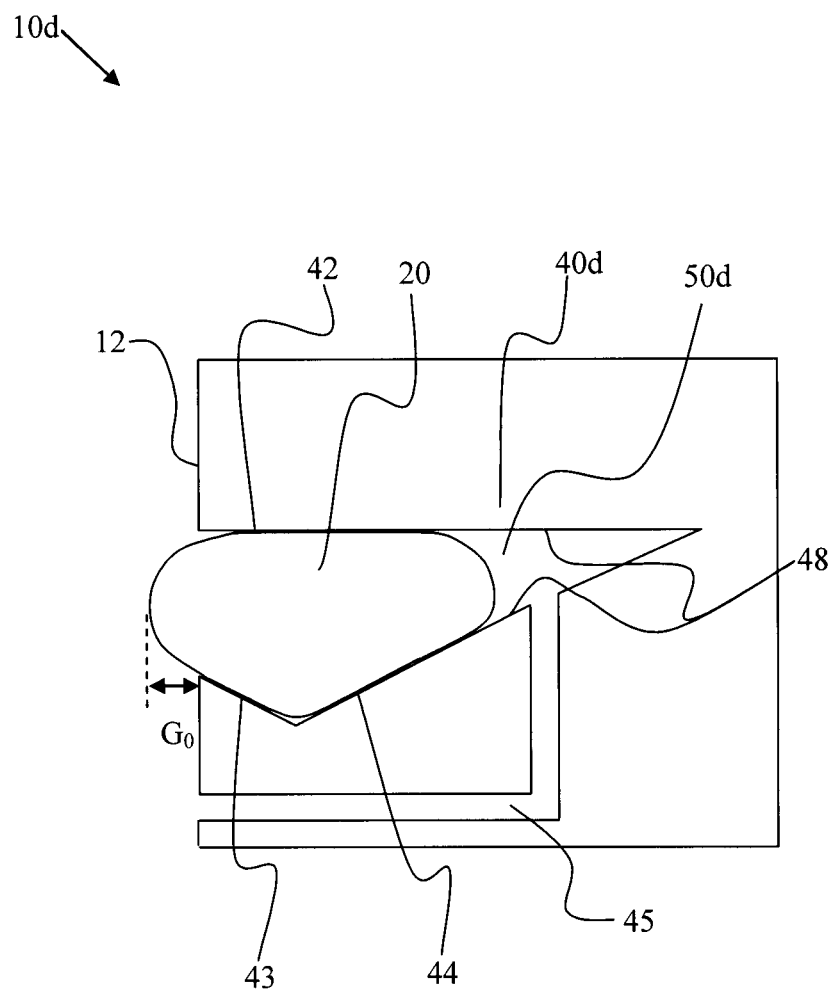
FIG. 2 is a schematic cross-section through a seal assembly in accordance with a second embodiment of the present invention, with a single seal retention face.

FIG. 2 is a schematic cross-section through a seal assembly 10d in accordance with a second embodiment of the invention, comprising a seal carrier 40d a seal-receiving groove 50d defined by a single seal retention face 43, contact faces 42 and 44, and pair of clearance faces 48. In this embodiment, the angles of clearance faces 48 are not equal, and contact face 42 is configured such that it is normal to the seal surface of the workpiece (not shown). This embodiment of the seal assembly facilitates retention of seal element 20 within groove 50b, regardless of other three-dimensional aspects of the groove, such as axi-symmetric seals, which are typically reliant on hoop stress for seal retention.

Figure 3:
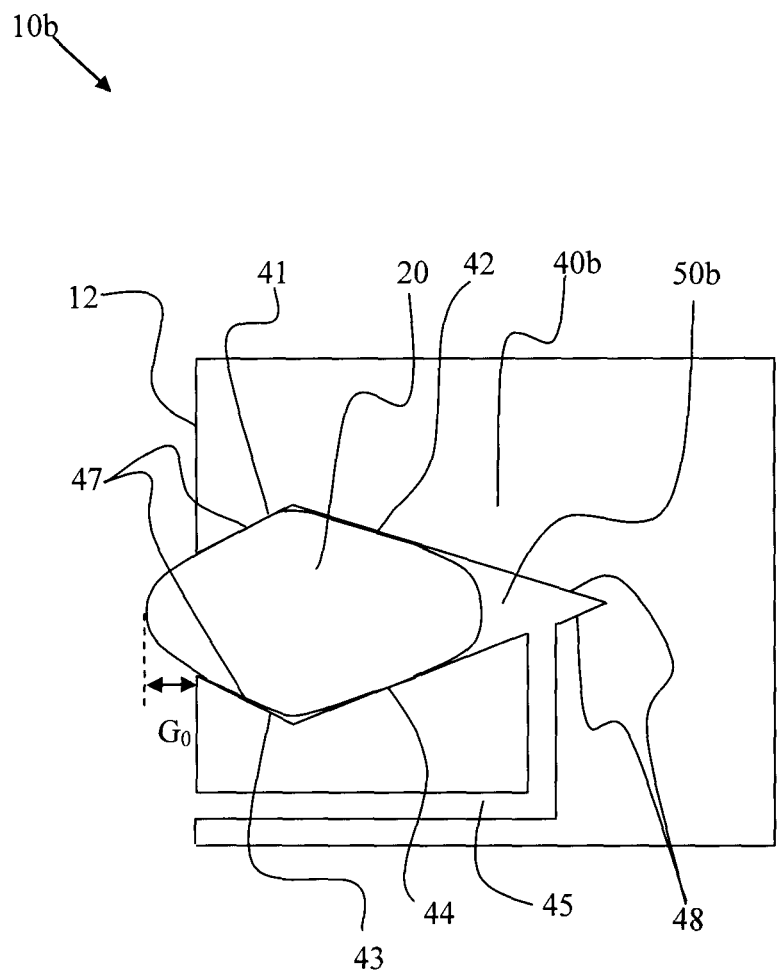
FIG. 3 is a schematic cross-section through a seal assembly of the present invention, with each groove-defining wall having a seal-retention face.

FIG. 3 is a schematic cross-section through a seal assembly 10b in accordance with a third embodiment of the invention. Seal assembly 10b comprises a seal carrier 40b having a seal-receiving groove 50b defined by two retention faces 41 and 43, contact faces 42 and 44, and pair of clearance faces 48, with a seal element 20 disposed within groove 50b. This embodiment of the seal assembly facilitates retention of seal element 20 within groove 50b, regardless of the configuration of the seal groove, and independent of other three-dimensional aspects of the groove geometry.

Figure 4:
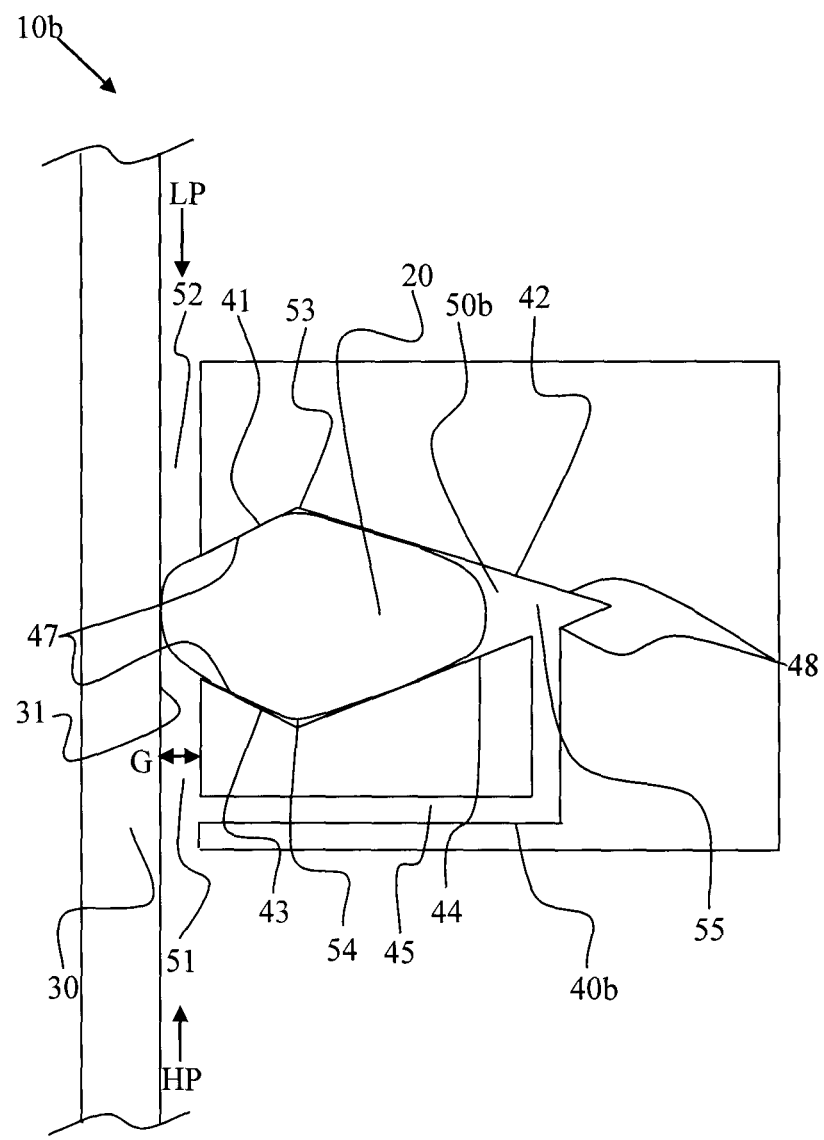
FIG. 4 is a schematic cross-section through the seal assembly of FIG. 3, shown as it would appear engaged with a workpiece with a large extrusion gap, and with a higher pressure applied to the bottom end of the assembly and a lower pressure applied to the upper end of the assembly.

FIG. 4 illustrates seal assembly 10b installed in association with a workpiece 30 with a comparatively large extrusion gap G between the proximal face 12 of seal carrier 40b and contact face 31 of workpiece 30. Seal groove 50b of seal carrier 40b has retention faces 41 and 43, contact faces 42 and 44, and pair of clearance faces 48. Retention faces 41 and 43 collectively form a diverging wedge 47, relative to the converging wedge provided by contact faces 42 and 44 collectively. The length and angle of retention faces 41 and 43 are selected in conjunction with the size and shape of seal element 20 to prevent loss of containment of seal element 20 during engagement and disengagement from workpiece 30. As well, retention faces 41 and 43 function to position seal element 20 in a neutral position to ensure engagement with workpiece 30 over a range of gap widths G.

Referring again to FIG. 3, seal element 20 is shown in a neutral position, and the maximum gap width at which initial seal engagement will occur is indicated by $G_0$. Referring again to FIG. 4, gap G is less than $G_0$, resulting in seal interference with the workpiece 30 as required to initiate a seal under pressure.

Figure 5:
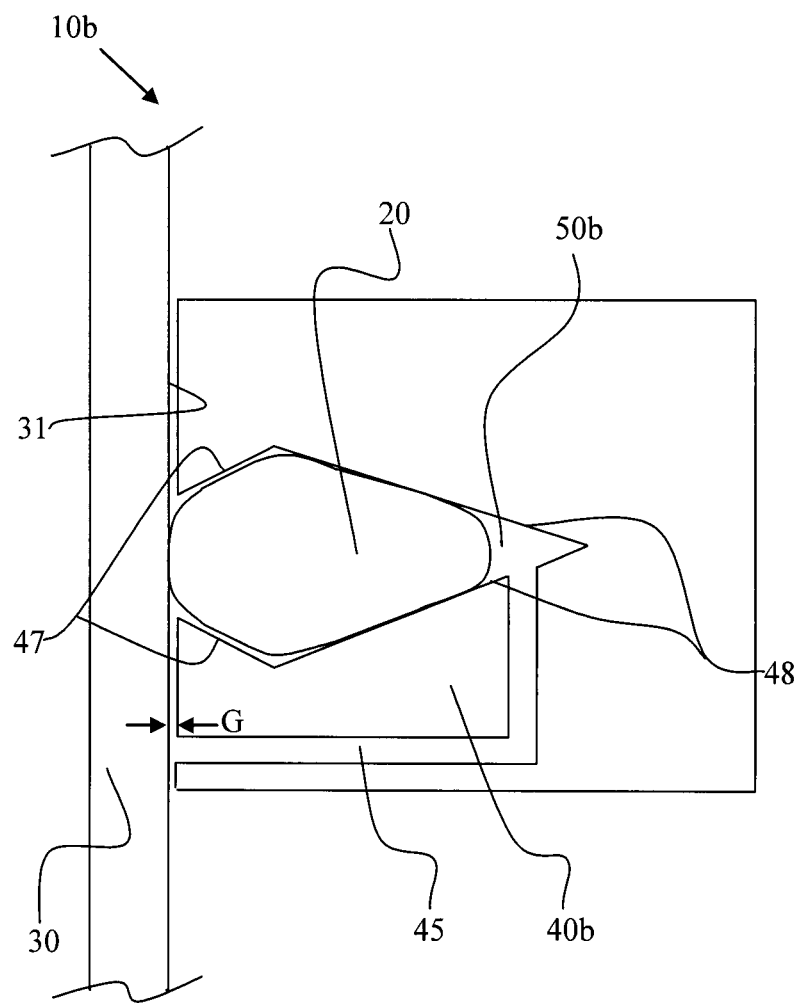
FIG. 5 is a schematic cross-section through the seal assembly of FIG. 3, shown as it would appear engaged with a workpiece with a small extrusion gap.

Referring now to FIG. 5, seal assembly 10b is shown engaged with a workpiece 30 with a smaller extrusion gap G than in FIG. 4, forcing seal element 20 further into seal groove 50b, such that it comes out of contact with both retention faces 47 and increases contact with both contact faces 42 and 44, but does not move deep enough to engage clearance faces 48.

Referring again to FIG. 4, the length and angle of contact faces 42 and 44 and clearance faces 48 are selected in conjunction with the size and shape of seal element 20 to allow for inward displacement of seal element 20 in a direction generally normal to contact face 31 of workpiece 30, to accommodate a selected range of gap widths G. Also, the angles of contact faces 42 and 44 are selected with consideration of frictional forces to ensure that seal element 20 tends to return to its neutral position upon unloading, to prevent "sticking" of seal element 20 within groove 50b.

It will be generally apparent that the present invention provides a means to increase the amount or range of allowable interference or "squeeze" for a seal element of a given cross-section, thus enabling the seal to function over a larger range of gap widths G than would otherwise be possible with a seal element of similar cross-section retained in a seal groove having a conventional, generally rectangular geometry. It will be further apparent that this desirable functionality is achieved because the amount of distortional strain generated by a given incremental reduction in gap G (i.e., increase in interference) is less than would occur if this same amount of "squeeze" were imposed on a conventional O-ring of similar cross-section between the workpiece and a conventional seal-carrying groove.

Referring still to FIG. 4, seal element 20 in this embodiment has a circular cross-section when unstressed, and is shown approximately as it would appear compressed and engaging contact surface 31 of workpiece 30 and contacting seal carrier 40b on contact faces 41, 42, 43 and 44. However, it will be understood that seal elements for use with the present invention are not limited to this cross-section, and that other seal shapes may be selected to suit particular design requirements or preferences. Seal shapes can be selected with geometric features that provide any or all of the following improvements in functionality over a seal element of circular cross-section:

Enhanced resistance to rotation and twisting during insertion, by providing flat surfaces that engage one or both contact faces, or, more preferably, by providing the seal element with a non-circular cross-section having its characteristic depth greater than its width; i.e., being elongate in the direction normal to the workpiece surface;

Reduced radial load during insertion, by providing a smaller contact area between the seal element and the contact faces; and Increased or decreased initial contact pressure, by modifying contact radii and/or providing a flat contact interface between the seal element and the workpiece or the seal carrier.

With reference to FIGS. 3 through 5, retention face pair 47, contact faces 42 and 44, and clearance faces 48 of seal assembly 10b are shown to be symmetrical top to bottom. However, it is to be understood that either or both of retention faces 47, either or both of contact faces 42 and 44, and either or both of clearance faces 48 can be non-symmetrical, as may be desirable in some cases. As such, deformation of seal element 20 is not necessarily limited to a direction normal to contact face 31 of workpiece 30.

Referring again to FIG. 4, seal element 20 is made of a sufficiently compliant (i.e., resilient) material such that, in the illustrated assembly, it comes into substantially conforming contact with contact faces 31, 41, 42, 43 and 44, thereby creating five chambers as follows:

outer LP (i.e., low-pressure) chamber 51, on the LP side of the seal assembly between workpiece contact face 31 and proximal face 12 of seal carrier 40b;

outer HP (i.e., high-pressure) chamber 52, on the HP side of the seal assembly between workpiece contact face 31 and proximal face 12 of seal carrier 40b;

inner LP chamber 53, bounded by the LP side of seal element 20 and adjacent regions of contact faces 41 and 42;

inner HP chamber 54, bounded by the HP side of seal element 20 and adjacent regions of contact faces 43 and 44; and distal chamber 55, bounded by a distal surface of seal element 20 and adjacent distal regions of contact faces 42 and 44.

A high-pressure fluid port 45 connects outer LP chamber 51 and distal chamber 55, such that distal chamber 55 is exposed to a source of higher pressure HP acting on one side of the seal assembly (i.e., the lower side in FIG. 4), while outer HP chamber 52 on the other side of the seal assembly is exposed to a source of comparatively lower pressure LP. It will be understood that although it is not directly linked to the source of higher pressure HP, inner HP chamber 54 can generally be assumed to be at the same higher pressure as a result of being surrounded by outer LP chamber 51 and distal chamber 55 which are at the higher pressure.

Figure 6:
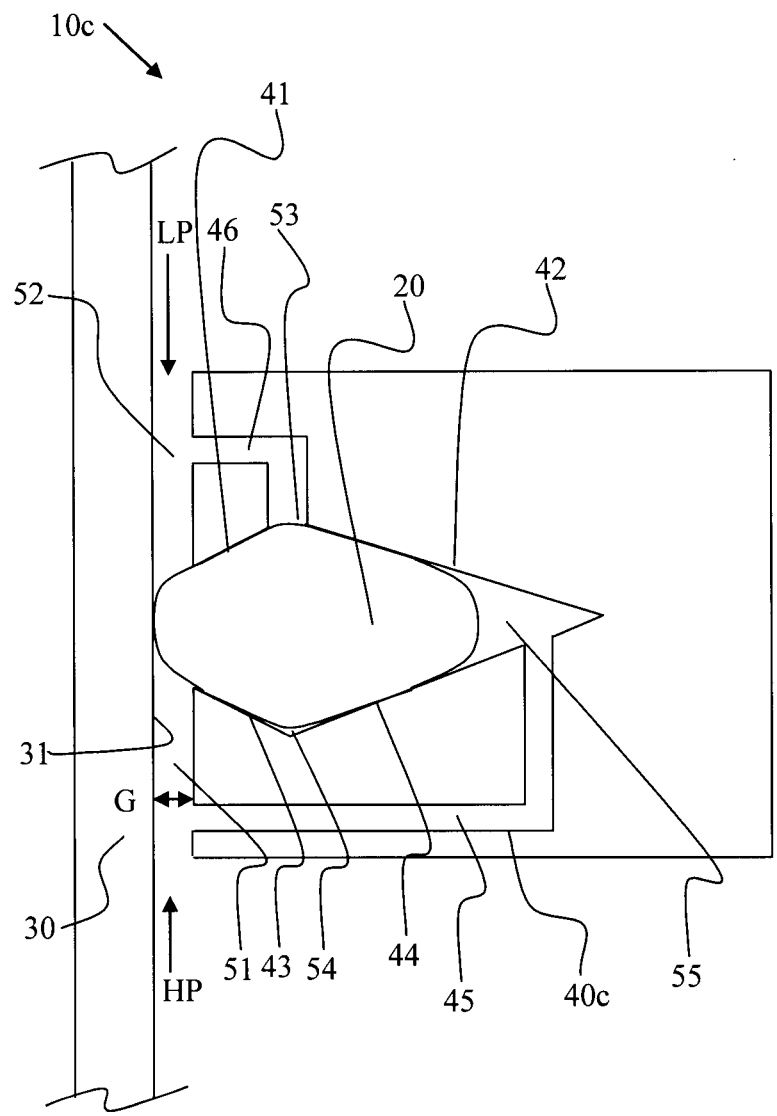
FIG. 6 is a schematic cross-section through a variant of the seal assembly in FIG. 4, with high-pressure and low-pressure fluid ports, shown as it would appear engaged with a workpiece with a large extrusion gap, and with a pressure differential as in FIG. 4.

It will also be understood that there may be some uncertainty as to whether seal element 20 will sealingly engage seal carrier 40b on retention face 41 or retention face 42. FIG. 6 illustrates a seal assembly 10c in accordance with an alternative embodiment in which this uncertainty is addressed by providing a low-pressure fluid port 46 connecting chambers 52 and 53, thereby ensuring that chambers 52 and 53 are linked to the lower pressure side (LP) of seal element 20. Conforming contact can remain between seal element 20 and all five contact faces 31, 41, 42, 43, and 44 as geometry may allow, but with only faces 31 and 42 needing to be in sealing engagement with seal element 20.

Figure 7:
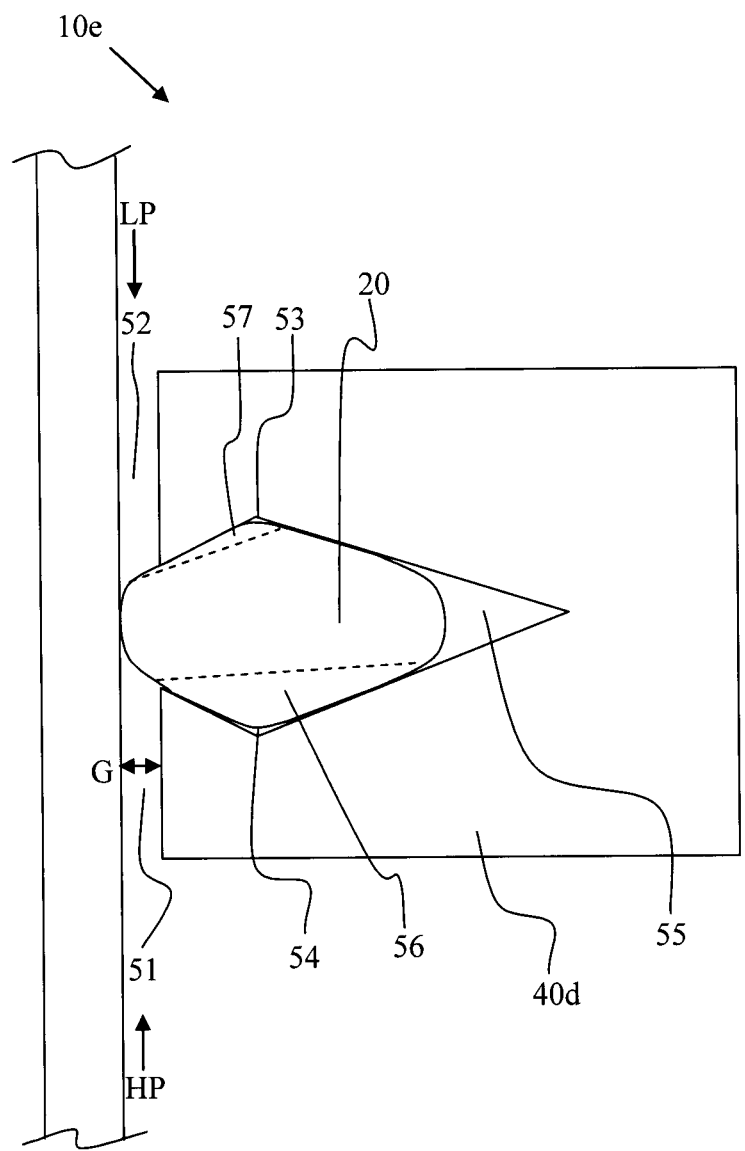
FIG. 7 is a schematic cross-section through a variant of the seal assembly in FIG. 6, with high-pressure and low-pressure fluid ports provided integral to the seal element, shown as it would appear engaged with a workpiece with a large extrusion gap, and with a pressure differential as in FIG. 6.

FIG. 7 is a schematic cross-section through a seal assembly 10e of the present invention. Seal assembly 10e is a variant of the seal assembly in FIG. 6 with a high-pressure fluid port 56 and a low-pressure fluid port 57 provided integral to seal element 20. HP fluid port 56, shown in FIG. 7 as a groove through seal element 20, connects high-pressure chambers 51, 54, and 55. LP fluid port 57, shown as a groove through seal element 20, connects low-pressure chambers 52 and 53. Although HP fluid port 56 and LP fluid port 57 are each shown as a single groove, it is to be understood that seal element 20 may be provided with multiple such grooves or ports arranged along its length.

The ported seal element provides fluid connectivity similar to the ported groove of the embodiment described with reference to FIG. 6. With the seal element thus configured, the seal retainer can be configured symmetrically about a seal groove centerline extending between the proximal and distal ends of the groove. Consequently, the unidirectional seal carrier becomes bidirectional, while the seal element becomes unidirectional. As such, to reverse the sealing direction, the seal element can be installed in the reverse orientation, which in this case would put the high-pressure port on the top and the low-pressure port on the bottom of the seal assembly (as viewed in FIG. 7). It is to be understood that this seal element can be provided with only a high-pressure port to provide functionality similar to that described with reference to FIGS. 1 through 5. It is also to be understood that a seal element thus configured can be assembled with a seal carrier that also includes high-pressure and/or low-pressure ports as described with reference to FIGS. 1 through 6, without loss of unidirectional sealing function.

Figure 8:
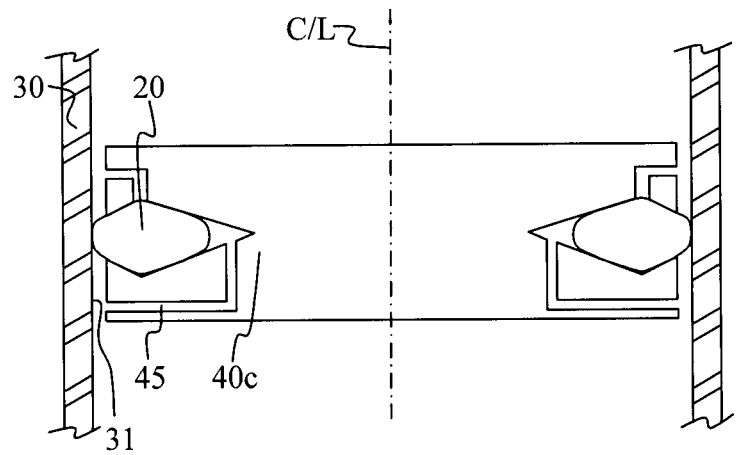
FIG. 8 is a cross-section through a circularly-configured seal assembly generally as shown in FIG. 6, with the seal-receiving groove being of toroidal configuration, and with the seal assembly disposed within and sealing against a tubular workpiece.

FIG. 8 illustrates a circularly-configured embodiment of a seal assembly generally as shown in FIG. 6, with the seal-receiving groove being of toroidal configuration, with the seal assembly coaxially disposed within and sealing against a tubular workpiece, and with the seal assembly and workpiece having a common centerline (C/L).

Figure 9:
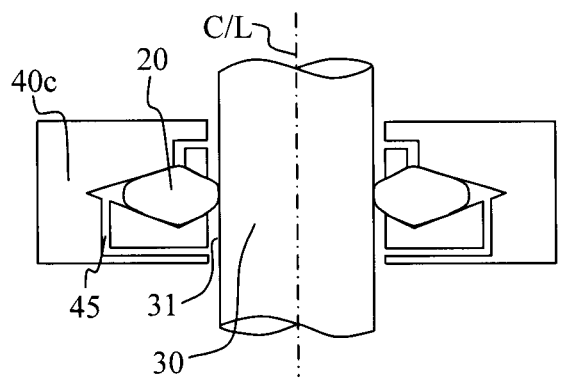
FIG. 9 is a cross-section through a circularly-configured seal assembly generally as shown in FIG. 6, with the seal-receiving groove being of toroidal configuration, and with the seal assembly surrounding and sealing against a tubular workpiece.

FIG. 9 illustrates an alternative circularly-configured embodiment of a seal assembly as in FIG. 6, with the seal-receiving groove being of toroidal configuration, and with the seal assembly coaxially surrounding and sealing against a tubular workpiece.

Seal Assembly For Tubular Running Tool

Figure 10:
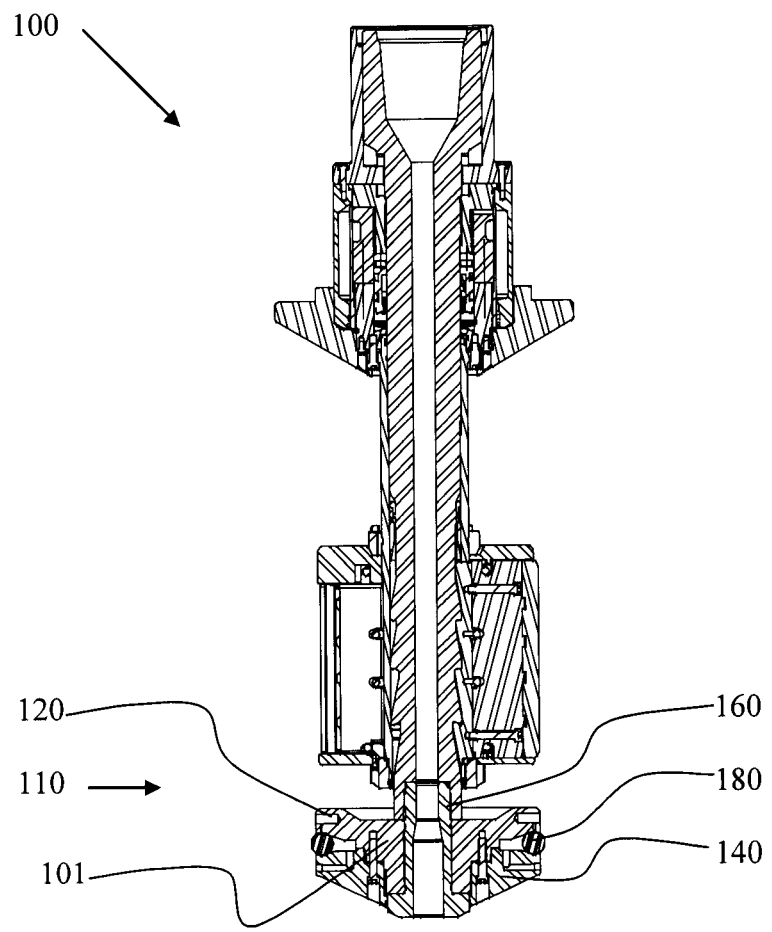
FIG. 10 is a cross-section through a tubular running tool with a seal assembly in accordance with an embodiment of the present invention mounted to the bottom end thereof, and shown as it would appear with the tubular running tool in the retracted position.

FIGS. 10 through 14 illustrate a preferred embodiment of the seal assembly of the present invention, incorporated into the lower end 101 of a tubular running tool 100. As shown in FIG. 10, seal assembly 110 comprises an upper seal retainer 120, a lower seal retainer 140, a seal assembly retention element 160, and a seal element 180. Seal assembly 110 is shown in FIG. 10 as it would appear with tubular running tool 100 in the retracted position (i.e., not engaging a tubular workpiece). In this case, seal element 180 is shown with a circular cross-section, with seal element 180 in its neutral, unstressed state partially protruding beyond both the upper and lower seal retainers 120 and 140. It is to be understood that this is for the purpose of illustrating interference between upper seal retainer 120, a lower seal retainer 140, and seal element 180, and that the assembled seal element 180 will be partially compressed by upper and lower seal retainers 120 and 140. As such, where seal element 180 is thus fully restrained as illustrated in this view, seal element 180 will come into conforming contact with both upper and lower seal retainers 120 and 140, and will sealingly engage upper seal retainer 120.

Figure 11:
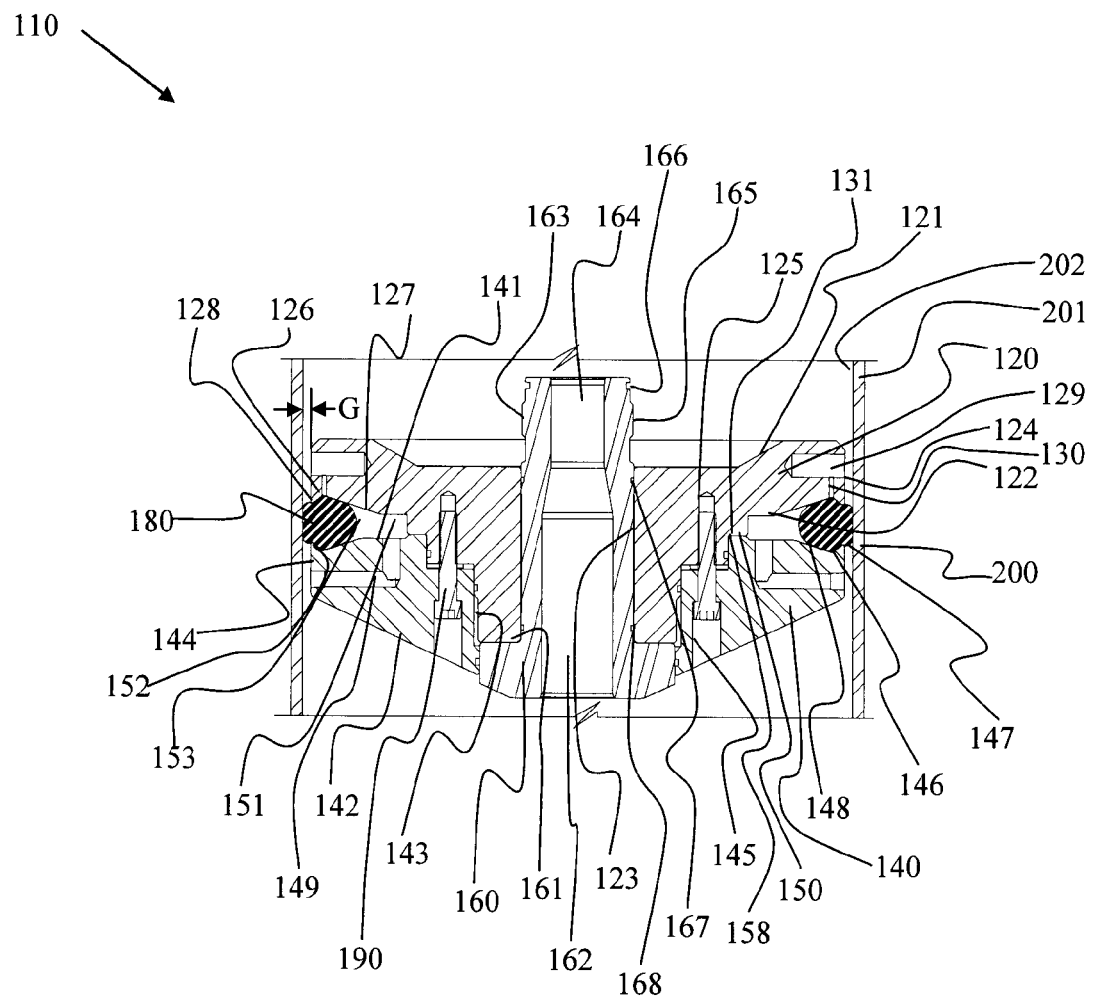
FIG. 11 is a cross-section through the seal assembly of FIG. 10, shown disposed within and in sealing engagement with an axi-symmetric tubular workpiece with a comparatively large extrusion gap.

FIG. 11 is a cross-section through seal assembly 110 coaxially dispose within a tubular workpiece 200 having an internal surface 202, and with seal element 180 in circumferential sealing engagement with internal surface 202. The diameter of the internal surface 202 of workpiece 200 is at the upper end of a specified allowable range for seal assembly 110 (i.e., gap G is comparatively large). Upper seal retainer 120 has an upper face 121, a lower face 122, an inner face 123, and an outer (or proximal) face 124. Lower face 122 of upper seal retainer 120 has a plurality of vertically-oriented bolt holes 125 to facilitate connection to lower seal retainer 140. Upper seal retainer 120 also has a downward-facing shoulder 131 and a double-faceted half seal groove 126, defined by a retention face 128 near outer face 124 and a contact face 127. Upper seal retainer 120 also has a plurality of radially-oriented pin holes 129 disposed on outer face 124 and connected to lower face 122 by relief ports 130, which intercept half seal groove 126 at the convergence point of the retention face 128 and contact face 127.

Referring still to FIG. 11, lower seal retainer 140 has an upper face 141, a lower face 142, an inner face 143, an outer face 144, and a plurality of bolt holes 145 extending between lower face 142 and upper face 141. Upper face 141 of lower seal retainer 140 has a double-faceted half seal groove 146, comprising a retention face 147 and contact face 148, near outer face 144, and an upward-facing shoulder 158. Upward-facing shoulder 158 of lower seal retainer 140 and downward-facing shoulder 131 of upper seal retainer 120 collectively form a pair of shoulders 150. Lower face 142 of lower seal retainer 140 is in this case configured as a stabbing guide, generally frustoconical in shape, and configured to centralize a casing running tool (not shown in FIG. 11) during insertion into proximal end 201 of workpiece 200.

Upper and lower seal retainers 120 and 140 are configured to be rigidly attached to one another such as, in the illustrated case, by a plurality of cap screws 190 threaded into holes 125 of upper seal retainer 120, with heads shouldering in counterbored holes 145 of lower seal retainer 140. Tension in cap screws 190 is reacted through shoulder pair 150.

Seal element 180 is disposed between upper and lower seal retainers 120 and 140 in seal groove 153. In the illustrated embodiment, seal element 180 is toroidal in shape; i.e., axisymmetric with a circular cross-section. Although shown in a compressed state, seal element 180, being made from a sufficiently resilient and compliant material, substantially conforms to the shape of seal groove 153, and is radially confined by inside surface 202 of workpiece 200. Seal groove 153 is defined by the pair of contact faces 148 and 127, clearance faces 151, and the pair of retention faces 152 and 128, where the angular orientations of contact faces 127 and 148 are selected to provide both resilience-driven rebound (i.e., spring-back) and resistance to "sticking" of seal element 180, where "sticking" is defined as the tendency of a seal element to remain in the radially inwardly displaced position within its seal groove upon removal of assembly 110 from workpiece 200, rather than elastically rebounding to a neutral position. The angular orientations of retention faces 127 and 147 are selected to prevent loss of containment of seal element 180, defined as the tendency of a seal element to come out of its seal groove during insertion into and extraction of the seal assembly from workpiece 200. The pair of retention faces 152 are configured such that when seal element 180 is not under pressure, they urge or bias seal element 180 toward a neutral position.

The radial position of the maximum height of seal groove 153 can be chosen in conjunction with the diameter of seal element 180 to provide a pre-stressing hoop compression or expansion of seal element 180 to bias it in favour of contact or retraction, as well as to locate seal element 180.

Referring still to FIG. 11, assembly retainer 160, located internal to and coaxially with upper seal retainer 120 is provided separate from upper seal retainer 120, and has upward-facing shoulder 161 at lower end 162 and thread element 163 at upper end 164. It is to be understood that assembly retainer 160 can be integral with upper seal retainer 120, and is shown in the illustrated embodiment as a separate component as may in some cases be necessary or desirable due to material strength and availability requirements.

Disposed along outer surface 165 of assembly retainer 160 are circumferential grooves containing seal elements 166, 167 and 168. Assembly retainer 160 is arranged such that seal elements 167 and 168 sealingly engage inner face 123 of upper seal retainer 120, while seal element 166 and thread element 163 collectively sealingly and threadingly engage lower end 101 of tubular running tool 100 (not shown in FIG. 10).

In the illustrated embodiment, seal element 180 has a circular cross-section. However, it is to be understood that a seal assembly in accordance with the present invention is not limited to the use of a seal element with this cross-sectional profile. A seal element suitable for use with the seal assembly is not restricted to any particular shape or configuration, provided that it provides: a contact interface with the inside surface of the workpiece for a range of widths of gap G; a sufficiently small exposed contact angle relative to the axis of the tool to facilitate seal element displacement into the seal groove when installing the tool in workpiece 200; and contact interfaces with the retention and contact faces of upper and lower seal retainers 120 and 140 respectively.

Figure 12:
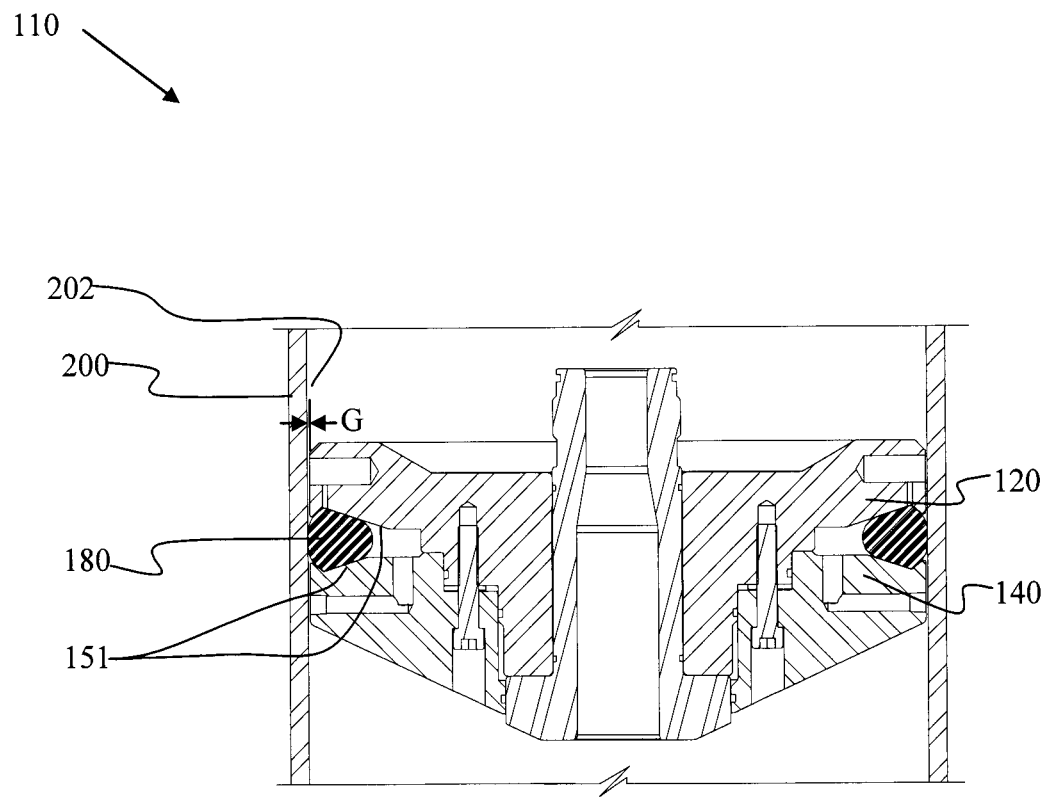
FIG. 12 is a cross-section through the seal assembly of FIG. 11, shown disposed within and in sealing engagement with an axi-symmetric tubular workpiece with a comparatively small extrusion gap.

FIG. 12 is a cross-section through seal assembly 110, positioned coaxially within and sealingly engaged with a workpiece 200, with workpiece 200 having an inside diameter at the lower end of the allowable range (i.e., gap G is comparatively small). Seal element 180, in conjunction with contact faces 128 and 148 and clearance faces 151, allows for radial inward displacement of seal element 180 when the inside surface 202 of workpiece 200 has a diameter at the small end of the allowable range. Seal element 180, which may have a circular cross-section when unstressed, is shown in this view compressed between seal retainers 120 and 140 and workpiece 200.

Referring again to FIG. 11, lower seal retainer 140 is provided with a plurality of fluid ports 149, which allow fluid flow between outer surface 144 and upper surface 141 of lower seal retainer 140, and to seal groove 153 internal to seal element 180, thus providing pressure acting on the inside of seal element 180 as a further means to promote or enhance sealing engagement of seal element 180 on inside surface 202 of workpiece 200. Seal groove 153 and fluid ports 149 may be filled with a grease or other substance having relatively high viscosity throughout the range of the tool's operating temperature in order to maintain relatively free communication of pressured fluid through ports 149, which might otherwise be plugged with drilling mud or other solids containing fluids, thus hindering or preventing pressure equalization and proper function of seal assembly 110.

Figure 13:
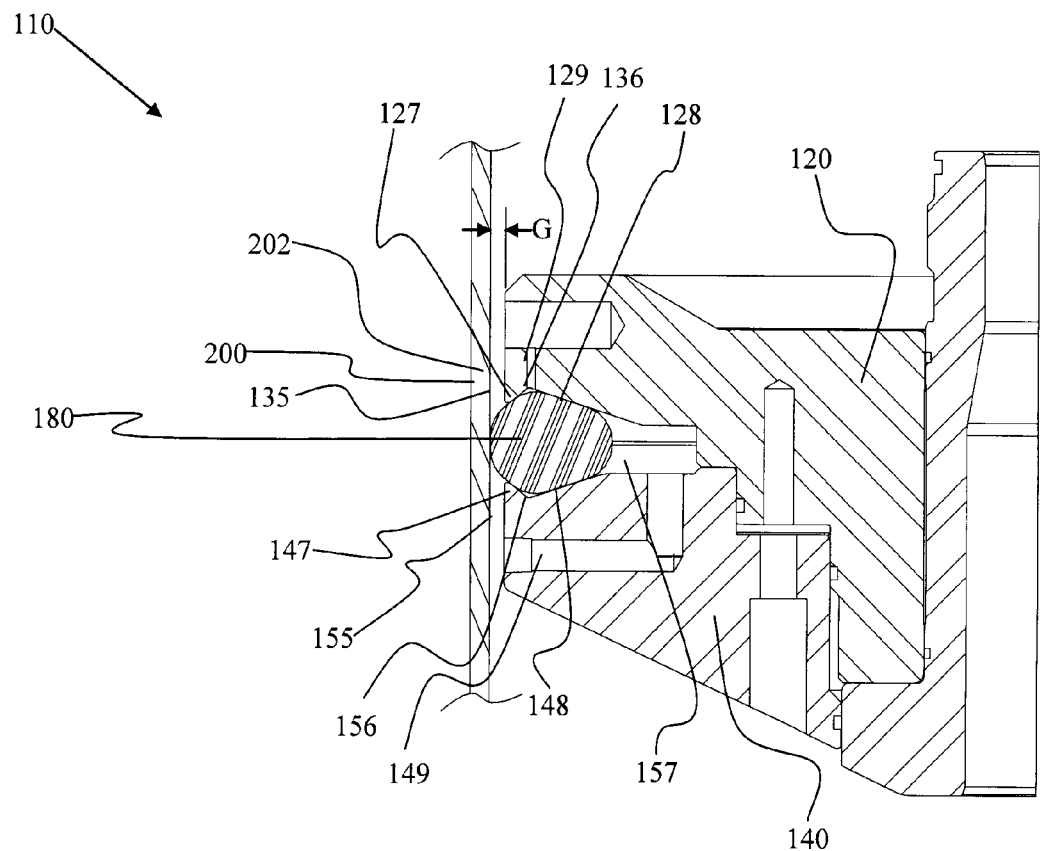
FIG. 13 is an enlarged partial cross-section through the seal assembly of FIG. 11.

The function and operation of seal assembly 110 may be readily understood with reference to FIG. 13, which is an enlarged partial cross-section through seal assembly 110 and workpiece 200 as shown in FIG. 12. While it is shown in this view that seal element 180 contacts and engages upper and lower seal retainers 120 and 140 in four locations on faces 127, 128, 147, and 148, and also engages inside surface 202 of workpiece 200, it is to be understood that if the diameter of inside surface 202 is small relative to the range of allowable inside diameters, resultant radial movement of seal element 180 may result in loss of seal engagement on surfaces 127 and 147. As such, seal element 180 will engage only on faces 128 and 148. Also as a result of this potentially intermittent contact, debris from inside surface 202 of the workpiece 200 can collect on surfaces 127 and 147, such that upon subsequent engagement, sealability on 120 and 140 may be compromised.

It is also to be understood that the high-pressure side of the seal is ported by fluid ports 149 to include chambers 155, 156, and 157, while the low-pressure side of the seal is ported by fluid ports 129 to include chambers 135 and 136. Consequently, sealing engagement occurs on surfaces 128 and 202.

Figure 14:
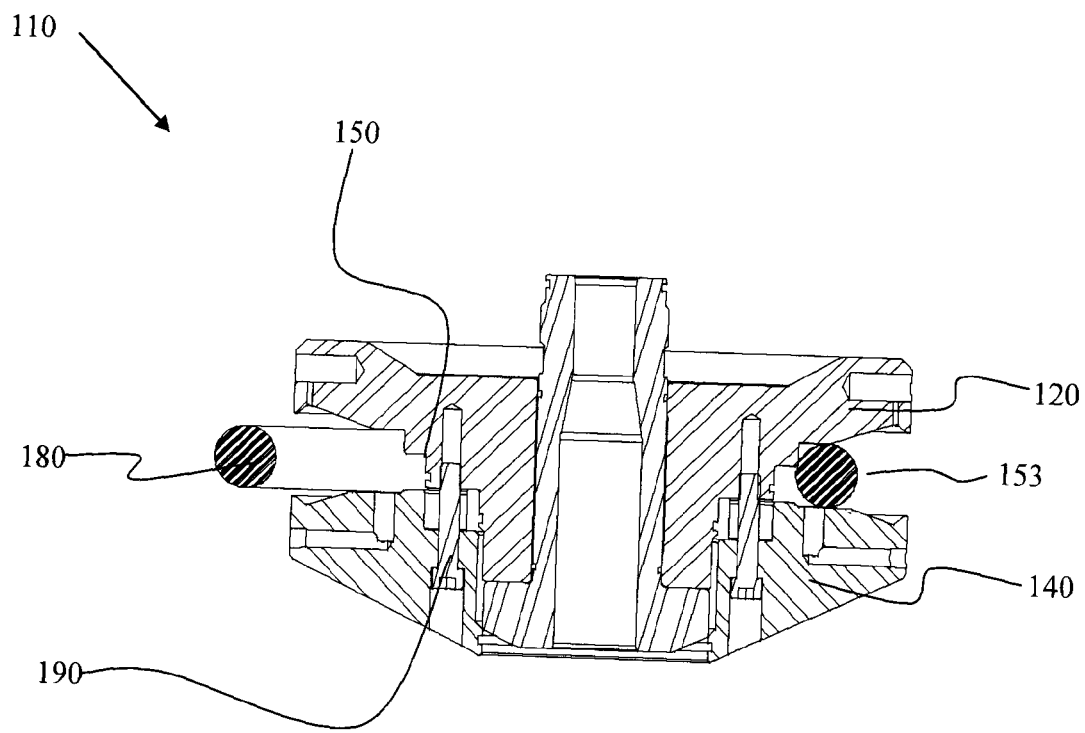
FIG. 14 is an enlarged partial cross-section through the seal assembly of FIG. 11, shown as it would appear partially disassembled to allow removal and replacement of the seal element.

Referring now to FIG. 14, which shows the seal assembly 110 as it would appear partially disassembled to allow removal of seal element 180 and installation of a new seal element 180. In this configuration the cap screws 190 of seal assembly 110 have been partially removed allowing additional separation between upper and lower seal retainers 120 and 140 respectively, in this position seal element 180 can be moved laterally in the seal groove 153 such that one side is located adjacent to the load shoulder pair 150 close to the mid-radius of the seal assembly, while the opposite end of seal element 180 is radially external to seal assembly 110 and can be removed provided seal element is of sufficiently low minor diameter and is fabricated from a sufficiently strong, flexible and compliant material typical of elastomers used for fluid seals.

In summary, the seal assembly described above comprises a seal carrier having a seal-receiving groove defined by two sidewalls carrying an elastomeric seal element engageable with a seal surface of a workpiece to seal the gap between the seal carrier and the workpiece, wherein:

the sidewalls (also referenced herein as contact faces) are configured such that the width of the seal groove decreases from its outer (or proximal) end toward its inner (or distal) end;

the elastomeric seal element is configured to be close-fitting with the contact faces, with the angular orientations of the two sidewalls relative to the seal surface of the workpiece being selected to allow the seal element to move in a direction generally normal to the seal surface while being compressed laterally between the contact faces; and when assembled in conjunction with the workpiece, the undeformed shape of the elastomeric seal element is arranged to interfere collectively with the confining surfaces of the workpiece and sidewalls of the groove, giving rise to contact stresses on these confining surfaces that in turn tend to seal the gap between the workpiece and seal carrier.

The geometric configuration of the seal groove is selected with consideration to anticipated friction forces, such that when the seal assembly is disengaged from the workpiece, the seal element moves outward from the seal groove toward its neutral position. Depending on the shape of the seal element and the seal groove geometry, it may be possible for the seal element to come out of the seal groove completely, in which case it will be desirable to provide seal retention means associated with the seal groove.

In the case of certain axi-symmetric seals, where the seal groove and workpiece are circular or cylindrical, seal retention may be accomplished using the inherent hoop stiffness of the seal element. However, for applications where this means of retention is insufficient or unavailable (such as, for example, in face seal applications), at least one of the sidewalls of the seal groove may be provided with a seal retainer in the form of a second tapered face (referred to herein as a retention face). As such, the seal groove geometry is selected so that the width of the groove is smaller near the outer (or proximal) surface of the seal carrier, where an outermost region of at least one sidewall serves as a retention face, which tapers away from the retention face on the opposite groove sidewall, to a point of maximum width where the retention face intersects the inside facet of the seal groove sidewall, defined previously as the contact faces.

The intersection point of the faces of the seal groove sidewalls defines a neutral position of the seal element; i.e., a position in which the seal element will be positioned when not under pressure or engaged on a workpiece. A neutral position is selected in conjunction with the seal element geometry to position the seal element to engage the workpiece and provide some initial contact engagement over the range of workpiece/seal carrier gap widths. The angles of the pair of retention faces relative to the seal surface of the workpiece is selected to position the seal element in a neutral position when not loaded and to prevent loss of seal containment by minimizing the seal groove opening width.

The seal assembly of the present invention is unidirectional, while the groove geometry can be symmetrical. The assembly is arranged such that the groove internal to the seal element is ported to the high-pressure side of the seal. As such, the seal element sealingly engages the seal surface of the workpiece and the contact face on the low-pressure side of the seal.

It is generally understood that the interference or "squeeze" limit for typical solid elastomeric seals, such as O-rings, is approximately 30%, before premature material breakdown of the seal element will occur. This is used as a measure of allowable distortional strain which the material can be expected to accommodate without failure. It will be apparent to one skilled in the art that seal assemblies with a reduced distortional-strain-to-gap-displacement ratio will accommodate an increase in the range of sealable gap widths without failure. In this context, "interference displacement" is defined as the difference between the unconstrained elastomeric seal located in the seal carrier and the seal surface of the workpiece, basically the magnitude that the gap size can be increased before the elastomer to seal surface contact is lost.

An advantage provided by generally axi-symmetric seal assemblies in accordance with the present invention is the ability to easily remove and replace seal elements, as may be necessary, due to wear or damage. Typically, elastomeric seals are installed by stretching the seal element over the seal carrier into a fixed geometry groove. This becomes increasingly difficult as the seal element thickness increases relative to the seal length, because more hoop strain and correlatively more force is required. To address this problem, seal carrier in accordance with the present invention may optionally comprise upper and lower parts, such that the parts can be partially disassembled, and the geometry of the seal groove may be selected so that the seal element can be moved laterally and removed from the seal carrier without requiring the seal element to be stretched.

It will be readily appreciated by those skilled in the art that various modifications of the present invention may be devised without departing from the scope and teaching of the present invention, including modifications which may use equivalent structures or materials hereafter conceived or developed. It is to be especially understood that the invention is not intended to be limited to any described or illustrated embodiment, and that the substitution of a variant of a claimed element or feature, without any substantial resultant change in the working of the invention, will not constitute a departure from the scope of the invention. It is also to be appreciated that the different teachings of the embodiments described and discussed herein may be employed separately or in any suitable combination to produce desired results.

In this patent document, any form of the word "comprise" is to be understood in its non-limiting sense to mean that any item following such word is included, but items not specifically mentioned are not excluded. A reference to an element by the indefinite article "a" does not exclude the possibility that more than one of the element is present, unless the context clearly requires that there be one and only one such element. Any use of any form of the terms "connect", "engage", "couple", "attach", or any other term describing an interaction between elements is not meant to limit the interaction to direct interaction between the subject elements, and may also include indirect interaction between the elements such as through secondary or intermediary structure. Relational terms such as "parallel", "perpendicular", "coincident", "intersecting", and "equidistant" are not intended to denote or require absolute mathematical or geometrical precision. Accordingly, such terms are to be understood as denoting or requiring substantial precision only (e.g., "substantially parallel") unless the context clearly requires otherwise.

The embodiments of the invention in which an exclusive property or privilege is claimed are defined as follows:

1. A fluid seal assembly, comprising:
  (a) a seal element of compliant material; and
  (b) a seal carrier comprising one or more seal carrier elements defining a sealing face with a seal-receiving groove interrupting the sealing face;

wherein:
  (c) the seal-receiving groove has opposing groove-defining walls, each of which has a proximal end at the sealing face and a distal end;

(d) the groove-defining walls serve as seal contact surfaces, with at least one of the seal contact surfaces converging inwardly to narrow the seal-receiving groove toward the distal end;
(e) the seal-receiving groove has a depth and a breadth suitable for receiving the seal element with the seal element projecting past the sealing face when compressed to be in contact with the seal contact surfaces;
(f) the depth of the seal-receiving groove exceeds the maximum penetration of the seal element such that an inner pressure chamber is formed toward the distal end of the seal contact surfaces; and
(g) a port extends from the sealing face through the seal carrier to the inner pressure chamber, such that the sealing face is in fluid communication with the inner pressure chamber.

2. The fluid seal assembly of claim 1, wherein the seal-receiving groove is narrowed at the sealing face by an inwardly projecting seal retainer at the proximal end of at least one of the seal contact surfaces.

3. The fluid seal assembly of claim 1, wherein the seal element has a generally circular cross-section.

4. The fluid seal assembly of claim 3, wherein the generally circular cross-section of the seal element has flat portions that generally correspond to the seal contact surfaces of the seal-receiving groove.

5. The fluid seal assembly of claim 1, wherein the seal element is axi-symmetric with an inner circumferential surface, an outer circumferential surface, and a generally circular cross-section.

6. The fluid seal assembly of claim 5, wherein the generally circular cross-section of the axi-symmetric seal element has flat portions, generally corresponding to the seal contact faces of the seal-receiving groove, with at least one of the flat portions converging from the outer circumference toward the inner circumference.

7. The fluid seal assembly of claim 1, wherein a first seal contact surface is carried by a first seal carrier element, and a second seal contact surface is carried by a second seal carrier element.

8. The fluid seal assembly of claim 1, wherein the seal element is made from an elastomeric material.

9. A fluid seal assembly, comprising:
(a) a seal element of compliant material; and
(b) a seal carrier comprising one or more seal carrier elements of relatively rigid material defining a sealing face with a seal-receiving groove interrupting the sealing face;
wherein:
(c) the seal-receiving groove has opposing groove-defining walls, each of which has a proximal end at the sealing face and a distal end;
(d) the groove-defining walls serve as seal contact surfaces, with at least one of the seal contact surfaces converging inwardly to narrow the seal-receiving groove toward the distal end;
(e) the seal-receiving groove has a depth and a breadth suitable for accepting the seal element with the seal element projecting past the sealing face when compressed to be in contact with the seal contact surfaces;
(f) the depth of the seal-receiving groove exceeds the maximum penetration of the seal element such that an inner pressure chamber is formed toward the distal end of the seal contact surfaces; and
(g) at least one port extends through the seal element such that the sealing face is in fluid communication with the inner pressure chamber.

10. A fluid seal assembly, comprising:
(a) a workpiece having a target seal surface;
(b) a seal element of compliant material; and
(c) a seal carrier assembly comprising:
c.1 one or more seal carrier elements of relatively rigid materials and having a sealing face shaped to be close-fitting with the target seal surface of the workpiece; and
c.2 a seal-receiving groove interrupting the sealing face, said seal-receiving groove being defined by a first seal contact surface and a second seal contact surface, each of said first and the second seal contact surfaces having a proximal section and a distal section;
wherein:
(d) the distal sections of the first and second seal contact surfaces converge to narrow the seal-receiving groove distally;
(e) the seal-receiving groove has a depth and a breadth suitable for receiving the seal element with the seal element projecting past the sealing face when compressed to be in contact with the first and second seal contact surfaces;
(f) the depth of the seal-receiving groove exceeds the maximum penetration of the seal element such that an inner pressure chamber is formed toward the distal end of the seal contact surfaces; and
(g) a port extends from the sealing face through the seal carrier to the inner pressure chamber, such that the sealing face is in fluid communication with the inner pressure chamber.

11. The fluid seal assembly of claim 10, wherein the seal-receiving groove is narrowed at the sealing face by an inwardly-projecting seal retainer at the proximal end of at least one of the seal contact surfaces.

12. The fluid seal assembly of claim 10, wherein the seal element has a generally circular cross-section.

13. The fluid seal assembly of claim 12, wherein the generally circular cross-section of the seal element has flat portions that generally correspond to the seal contact surfaces of the seal-receiving groove.

14. The fluid seal assembly of claim 10, wherein the seal element is axi-symmetric with an inner circumferential surface, an outer circumferential surface and a generally circular cross-section.

15. The fluid seal assembly of claim 14, wherein the generally circular cross-section of the axi-symmetric seal has flat portions generally corresponding to the seal contact faces of the seal-receiving groove, with at least one of the flat portions converging from the outer circumference toward the inner circumference.

16. The fluid seal assembly of claim 10, wherein a first seal contact surface is carried by a first seal carrier element and a second seal contact surface is carried by a second seal carrier element.

17. The fluid seal assembly of claim 10, wherein the seal element is made from an elastomeric material.

18. A fluid seal assembly, comprising:
(a) a workpiece having a target seal surface;
(b) a seal element of compliant material; and
(c) a seal carrier assembly comprising:
c.1 one or more seal carrier elements of relatively rigid materials and having a sealing face shaped to be close-fitting with the target seal surface of the workpiece; and
c.2 a seal-receiving groove interrupting the sealing face, said seal-receiving groove being defined by a first seal contact surface and a second seal contact surface, each of said first and the second seal contact surfaces having a proximal section and a distal section;

wherein:
- (d) the distal sections of the first and second seal contact surfaces converge to narrow the seal-receiving groove distally;
- (e) the seal-receiving groove has a depth and a breadth suitable for receiving the seal element with the seal element projecting past the sealing face when compressed to be in contact with the first and second seal contact surfaces;
- (f) the depth of the seal-receiving groove exceeds the maximum penetration of the seal element such that an inner pressure chamber is formed toward the distal end of the seal contact surfaces; and
- (g) at least one port extends through the seal element such that the sealing face is in fluid communication with the inner pressure chamber.

19. A fluid seal assembly, comprising:
- (a) a workpiece having a target seal surface;
- (b) a compliant elastomeric seal element; and
- (c) a seal carrier assembly comprising:
  - c.1 two or more seal carrier elements of relatively rigid materials having a sealing face shaped to be close fitting with the target seal surface of the workpiece; and
  - c.2 a seal-receiving groove interrupting the sealing face, said seal-receiving groove being defined by a first seal contact surface carried by a first of the two or more seal carrier elements and a second seal contact surface carried by a second of the two or more seal carrier elements, each of said first and second seal contact surfaces having a proximal section and a distal section;

wherein:
- (d) the distal sections of the first and second seal contact surfaces converge to narrow the seal-receiving groove distally;
- (e) the seal-receiving groove has a depth and a breadth suitable for receiving the seal element with the seal element projecting past the sealing face when compressed to be in contact with the first seal contact surface and the second seal contact surface; and
- (f) the depth of the seal-receiving groove exceeds the maximum penetration of the seal element to define an inner pressure chamber toward the distal end of the seal contact surfaces, with a port extending from the sealing face through the seal carrier to the inner pressure chamber, whereby fluid from the sealing face can communicate with the inner pressure chamber.

* * * * *